US 6,684,400 B1

(12) United States Patent
Goode et al.

(10) Patent No.: US 6,684,400 B1
(45) Date of Patent: *Jan. 27, 2004

(54) METHOD AND APPARATUS FOR PROVIDING DYNAMIC PRICING SERVICES FOR AN INTERACTIVE INFORMATION DISTRIBUTION SYSTEM

(75) Inventors: Christopher Goode, Menlo Park, CA (US); Donald F. Gordon, Pacific Grove, CA (US); Tobie LaRocca, San Jose, CA (US); Phillip A. Thomas, San Jose, CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,955

(22) Filed: May 7, 1999

Related U.S. Application Data (63) Continuation of application No. 09/086,799, filed on May 29, 1998.

(51) Int. Cl.[7] ............................ H04N 5/445; H04N 7/16; H04N 7/173; G06F 3/00; G06F 13/00
(52) U.S. Cl. ............................... 725/61; 725/40; 725/5; 725/87
(58) Field of Search ..................... 725/1, 5, 40, 60–61, 725/87, 101, 104; 345/327, 721; 709/217, 219; 705/10, 14, 15, 20, 26–27

(56) References Cited

U.S. PATENT DOCUMENTS

| | | | |
|---|---|---|---|
| 5,585,866 A | 12/1996 | Miller et al. | 348/731 |
| 5,619,249 A | 4/1997 | Billock et al. | 348/7 |
| 6,314,572 B1 * | 11/2001 | LaRocca et al. | 725/60 |
| 6,314,573 B1 * | 11/2001 | Gordon et al. | 725/61 |

FOREIGN PATENT DOCUMENTS

EP     0 833 511 A2     4/1998

OTHER PUBLICATIONS

Gordon et al. ; Method and apparatus for providing subscription-on-demand services for an interactive information distribution system; Jan. 31, 2002; US 2002/0013944 A1.*
LaRocca et al. ; Method of providing suscription-on-demand services; Feb. 21, 2002; US 2002/0023268 A1.*

* cited by examiner

Primary Examiner—Chris Grant
Assistant Examiner—Hai V. Tran
(74) Attorney, Agent, or Firm—Moser, Patterson & Sheridan, LLP (57) ABSTRACT

A method and apparatus for providing subscription-on-demand (SOD) services for a interactive information distribution system, where a consumer may subscribe to packages of on-demand programs for a single price and view the programs in the subscribed package at any time for no additional cost. The apparatus and method are embodied in a combination of software, which provides a so called navigator, and hardware, including a subscriber terminal that provides certain functionality for the navigator and service provider equipment that supports the functionality of the terminal. As such, graphical user interface functionality is distributed between the service provider equipment and subscriber equipment (subscriber terminal). Such distribution provides an enjoyable, real time interactive process for accessing SOD services that allows the subscriber to rapidly identify and access a subscription service. In addition, a non-subscriber of a particular service is quickly identified and provided the opportunity to, through the use of a graphical user interface, subscribe to the programming provided by the system.

24 Claims, 11 Drawing Sheets

METHOD AND APPARATUS FOR PROVIDING DYNAMIC PRICING SERVICES FOR AN INTERACTIVE INFORMATION DISTRIBUTION SYSTEM

CROSS REFERENCE TO RELATED APPLICATIONS

This application is a continuation of the prior, patent application Ser. No. 09/086,799, filed on May 29, 1998 and entitled: METHOD AND APPARATUS FOR PROVIDING SUBSCRIPTION-ON-DEMAND SERVICES FOR AN INTERACTIVE INFORMATION DISTRIBUTION SYSTEM, and herein incorporated into the present continuation application by reference.

BACKGROUND OF THE INVENTION

1. Field of the Invention

The present invention relates to an interactive information distribution system such as a video-on-demand (VOD) system. More particularly, the present invention relates to a method and apparatus for providing subscription-on-demand (SOD) services for such an interactive information distribution system.

2. Description of the Background Art

Recent advances in digital signal processing techniques and, in particular, improvements in digital compression techniques, have led to a plethora of proposals for providing new digital services to a customer's home via existing telephone and coaxial cable networks. For example, it has been proposed to provide hundreds of cable television channels to subscribers by compressing digital data and digital-video, transmitting the compressed digital signals over conventional coaxial cable television channels, and then decompressing the signals in the subscriber's receiver. Another proposed application for this technology is a video-on-demand (VOD) system in which a subscriber communicates directly with a video service provider via telephone lines to request a video program from a video library and the requested video program is routed to the subscriber's home via telephone lines or via coaxial cable television cables for immediate viewing. Other proposed VOD systems use a frequency multiplexing technique to enable control information for a subscriber's receiver to be transmitted through a cable network back to an information server. Such a system permits a bi-directional communications over a single network.

In most of these information distribution systems, graphical menus are displayed upon the subscribers television and using a remote control device, a subscriber selects a desired program for viewing. One such graphical user interface based VOD system is disclosed in U.S. Pat. No. 5,619,249, issued Apr. 8, 1997, and hereby incorporated herein by reference, wherein a viewing station including a television monitor and a high-power graphics computer are used to generate a graphical user interface. The viewing stations are in communication with a telecasting facility (i.e., service provider head end equipment) that transmits selected video information as requested by the viewing station. The graphics computer within the viewing station locally stores all the executable programs that generate the graphical interface, control the graphical interface, and interact with the subscriber. The graphics computer not only enables a subscriber to select programming to view, but also enables a non-subscriber to become a subscriber by interacting with certain interface screens.

Although having such a high-power computer within the viewing station is beneficial in providing nearly instantaneous responsiveness to the subscriber's and non-subscriber's inputs, such a high-power computer system is economically unfeasible to utilize as subscriber equipment for a large number of subscriber homes. As such, set top terminals or television receivers containing built-in high-power computers are generally not feasible as a commercial product.

Additionally, prior art VOD systems have only contemplated selling services on a program-by-program basis. For example; in the prior art systems, a viewer navigates through various menus to arrive at a menu containing a program title that the subscriber desires to view. The subscriber then requests the program and the program is supplied to the subscriber's display. The subscriber's account is then billed for the order of that particular program. As such, the concept of subscriptions extends only to the general access to content and an a la carte purchase of a unit of content. In this respect, the consumer's experience is nothing more than the transformation of the video store experience to the customer's home; the consumer is purchasing the ability to access a program for a prescribed period of time. Such systems use the term "subscriber" to represent someone who has received an installation of the subscriber equipment to enable a technically different class of service to be accessed, namely, digital or analog/digital services instead of the purely analog telecasts of conventional cable television. Consequently, the "subscription" as used in the prior art refers to the capability of selecting from a list a single unit of content such as a movie or video. Heretofore, VOD systems have not had a capability of packaging programming at a single price such that a system subscriber can also be a program package subscriber to enable the package subscriber to view any program in the subscribed package without further cost.

Therefore, there is a need in the art for a method and apparatus for providing subscription-on-demand services for an interactive information distribution system. There is also a need to provide these services using equipment having a significant portion of the computing power is contained within a service provider head end system such that a terminal for the subscriber's home can be manufactured relatively inexpensively.

SUMMARY OF THE INVENTION

The disadvantages heretofore associated with the prior art are overcome by the present invention of a method and apparatus for providing subscription-on-demand (SOD) services for a interactive information distribution system, where the system provides distributed computing resources using a relatively inexpensive subscriber terminal. The invention is embodied in a combination of software, which provides a so-called "navigator", and hardware, including subscriber equipment and service provider equipment that is interconnected by a communications network. The graphical user interface functionality is distributed between the service provider equipment and subscriber equipment. Such distribution provides an enjoyable, real time interactive session that allows the consumer to rapidly navigate through a plethora of menus to find particular information which the consumer desires to view. In addition, a non-subscriber of a particular SOD service is quickly identified and provided the opportunity to, through the use of a graphical user interface, subscribe to the programming provided by the system.

Using the inventive equipment, a consumer is capable of further subscribing to packages of on-demand programming, i.e., SOD services, through manipulation of the graphical user interface. The system provides certain packages of on-demand programming, i.e., childrens programming, that a consumer may elect to subscribe to for a single price. As such, through manipulation of the menus, the consumer selects a programming package, becomes a subscriber to that package and is billed accordingly. Thereafter, the subscriber may view any program in the package without additional cost. Although predefined programming packages are generally available for selection, a consumer may optionally create a personal SOD service by selecting programs for a personal package that can then be subscribed to as any other programming package.

Consequently, the invention differs from the prior art from both an architectural standpoint and data management standpoint. Together these innovations provide a complex price and data capacity management infrastructure necessary to offer a consumer friendly approach to subscribing to a class of data or service content. This service content might be grouped by any logical association such as a series of movies or other program content. The SOD service concept of having a single price for a package of programming removes the payment commitment challenge ordinarily posed by the prior art as a barrier to viewing each item of content.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method and apparatus that provides a subscription-on-demand (SOD) service for an interactive information distribution system. Throughout the following description the term "SOD service" is defined as the capability of a consumer to subscribe to packages of programming at a pre-defined price and those programs within a subscribed package can be viewed, on-demand, without further cost to the subscriber. As such, a consumer (i.e., a viewer having a system account number) can request, through manipulation of a graphical user interface, to subscribe to a package of programming, i.e., children's programming, at a fixed price. Thereafter, any program within the package can be viewed at anytime, i.e., on-demand, without further charge. Optional viewing time restrictions and the like can be implemented to limit package content viewing only during predefined time periods or, if viewing outside the time period is desired, an additional fee is charged to the subscriber's account.

Although the SOD service of the present invention can be implemented and executed using a number of different types of information distribution systems, the preferred embodiment is used in combination with the interactive information distribution system hardware described in commonly assigned U.S. patent application Ser. No. 08/984,710, filed Dec. 3, 1997, and hereby incorporated herein by reference. However, the specific hardware arrangement is considered illustrative of the type of system with which the invention is used. Use of the invention within other information distribution system hardware arrangements that facilitate distributed computing resources between the service provider head end and the subscriber's terminal is considered within the scope of the invention.

Figure 1:
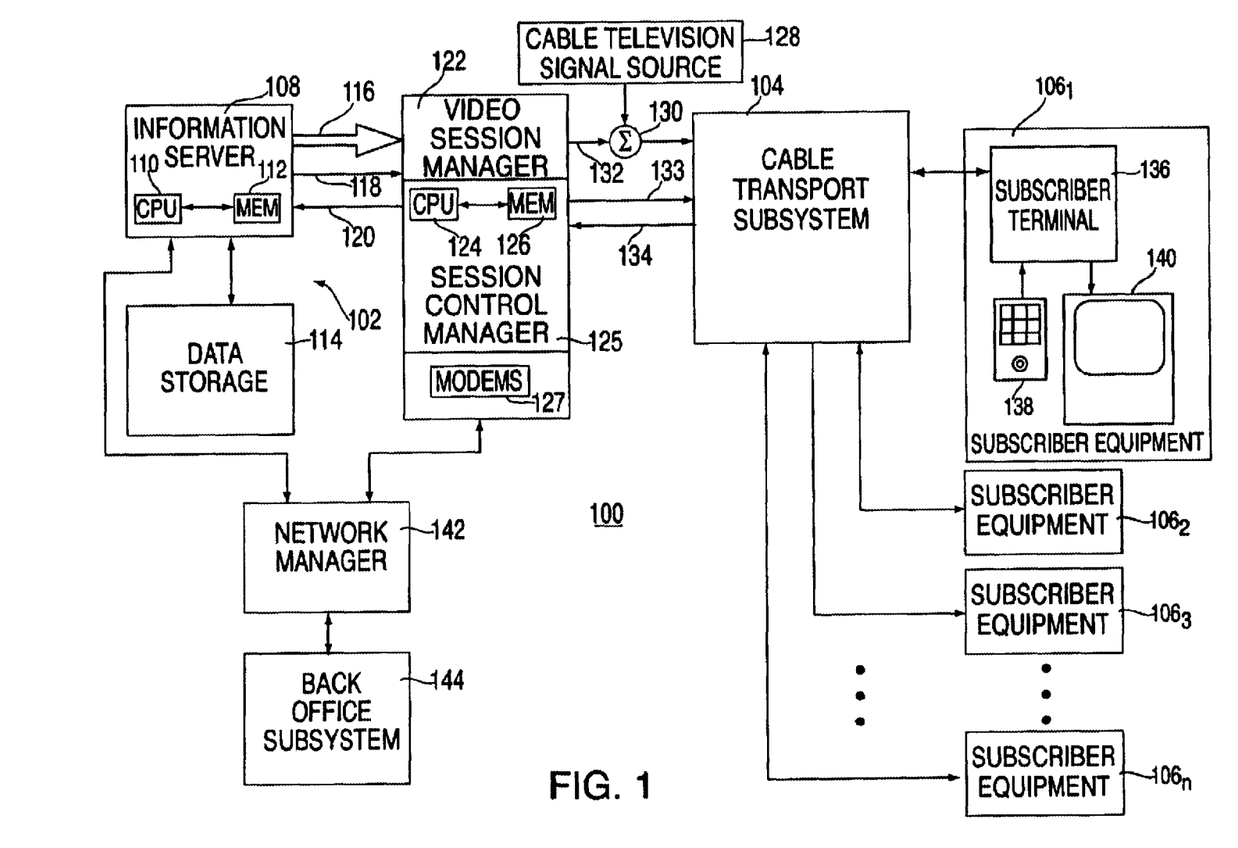
FIG. 1 depicts a high level block diagram of an interactive information distribution system containing the present invention.

FIG. 1 depicts a high level block diagram of the illustrative information distribution system 100 that incorporates the present invention. The system 100 contains service provider equipment 102, a communications network in the form of a cable transport subsystem 104 and subscriber equipment $106_n$, where n is an integer greater than 0. The service provider equipment 102 contains an information server 108 which is typically a parallel processing computer containing at least one central processing unit 110 and associated memory 112. U.S. Pat. No. 5,671,377, issued Sep. 23, 1993 and U.S. Pat. No. 5,579,527, issued Nov. 26, 1996, which are hereby incorporated herein by reference, describe a server that is capable of operating in the capacity of information server 108. The server 108 interacts with the data storage device 114 (e.g., a disk drive array) that generally stores the subscriber information (e.g., video data) that will be recalled and downloaded to the subscriber equipment 106. Additionally, within the service provider equipment 102 is a video session manager 122 that provides session control of the information flowing to and from the server 108. The video session manager 122 contains its own central processing unit (CPU) 124 and associated memory 126 that provides functionality for the graphical user interfaces through which the consumer interacts with the system. The CPU 124 is part of a session control manager 125 that controls a plurality of modems 127 that facilitate communication with the subscriber equipment. Other subsystems of the service provider equipment include a network manager 142 and a back office subsystem 144. These subsystems maintain certain databases of information that enable the system to accurately control system access, subscription package definitions, and subscriber/consumer profile and billing.

The information server 108 is coupled to the video session manager 122 via data path 116, synchronization clock path 118, and control path 120. The server 108 provides data streams that are destined for consumers on path 116 and a synchronization clock on path 118. The specific data streams are provided in response to requests for information (e.g., menu applets, video programs, and other content material) from the video session manager 122 on path 120. These data streams are packetized and modulated onto a carrier that is compatible with the transmission requirements of the network 104.

The video session manager 122 accomplishes all of the transmission interface requirements of the system 100 as well as provides graphical user interface support. Specifically, the video session manager 122 is coupled through the modems 127 to subscriber equipment via a forward information channel 132, a forward command channel 133 and a back channel 134. All three of these channels are supported by the cable transport subsystem 104. The video session manager 122 contains a modulator for modulating the server data streams onto one or more carrier frequencies for transmission on the forward information channel 132. Additionally, modems 127 within the video session manager 122 send control information via the forward command channel and receive control information via the back channel. Moreover, a conventional cable television signal source 128 is optionally coupled to the forward information channel via a signal coupler 130. In operation, the video session manager 122 responds to requests from the subscriber equipment 106 for interactive menus and data streams by requesting the server 108 to provide such information, then communicating that information to the requesting subscriber equipment 106. The video session manager 122, as discussed below, also ensures that the subscriber equipment 106 is authorized to receive the requested information.

The cable transport subsystem 104 can be any one of a number of conventional broad band communications networks that are available such as a fiber optic network, a telephone network, existing cable television network and the like. For example, if the network is a hybrid fiber-coax network, the transport technique used in both forward channels may be modeled after the moving pictures expert group (MPEG) transport protocol for the transmission of video data streams. In general, the transport mechanism for both the forward channels and transport information to the subscriber equipment must be able to carry unidirectional, asynchronous packetized data such as that defined in the MPEG video and audio signal transmission protocol, and the like. There are a number of such transport protocols available.

The subscriber equipment 106 receives the requested data streams from the forward information channel, demodulates the streams and processes them for display on the display device 140 (e.g., a conventional television). In addition, the terminal 136 accepts commands from a remote control input device 138 or other input device to facilitate consumer interaction with the system. These commands are formatted, compressed, modulated, and transmitted through the network 104 to the video session manager 122. Typically, this transmission is accomplished through the back channel 134. These commands are preferably transmitted through the same network used to transmit information to the subscriber equipment. However, the back channel coupling the subscriber equipment to the server may be a separate network, e.g., a forward information channel through a television cable network and a back channel through a telephone network. The telephone network could also support the forward control channel. The video session manager 122 interprets each command set from the terminal through the back channel and instructs the information server to perform certain functions to implement the consumer/subscriber request.

Figure 2:
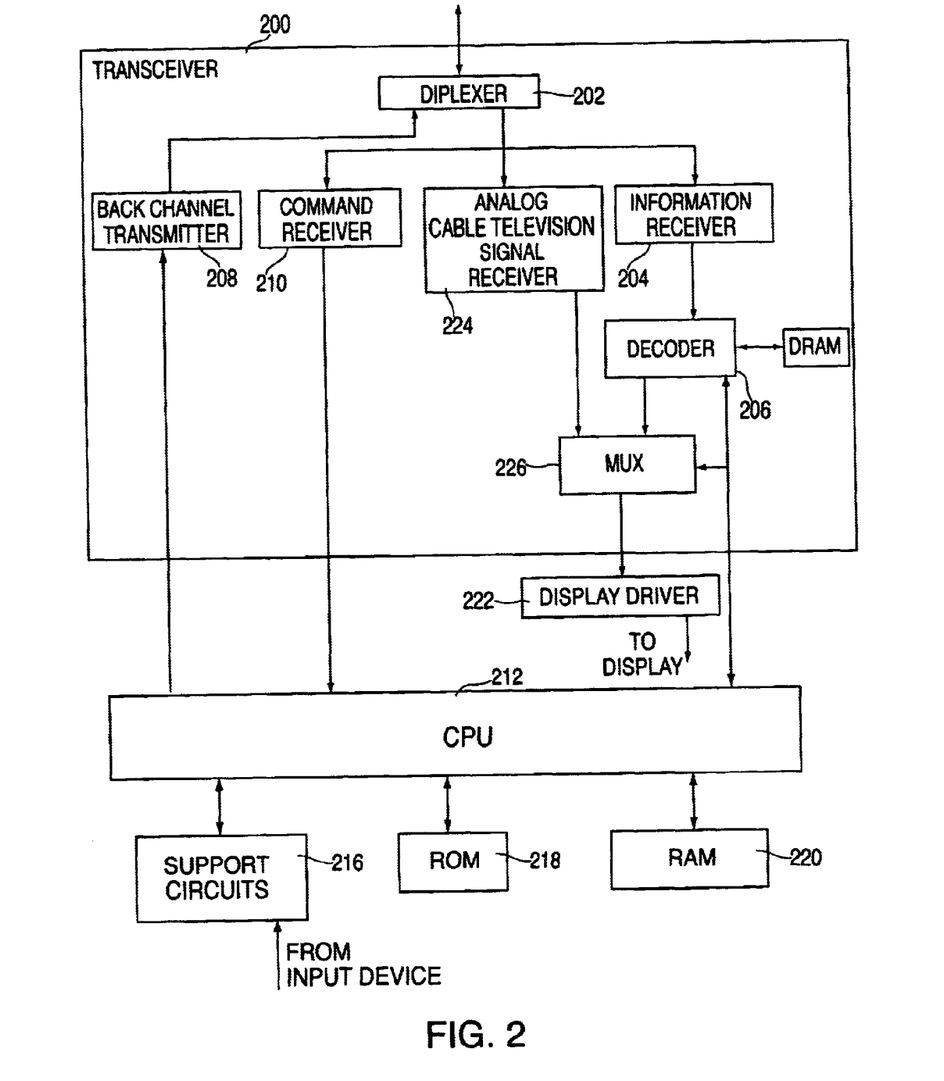
FIG. 2 depicts a block diagram of an illustrative subscriber's terminal within the system of FIG. 1.

FIG. 2 depicts a block diagram of the terminal 136 which contains a transceiver 200, a central processing unit (CPU) 212 and a display driver 222. Of course, the functionality of the terminal 136 can be embedded within a single consumer electronics product such as a receiver circuit within a television. As such, the description of a separate terminal should be considered illustrative of the type of subscriber equipment that may be used to implement the present invention.

Within the set top terminal 136, the CPU 212 is supported by random access memory (RAM) 220, read only memory (ROM) 218 and various support circuits 216 such as clocks, power supply, and infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers of the terminal. Each receiver 204 and 210 contains a tuner, amplifiers, filters, a demodulator and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well known in the communications art and could be used in this application. However, this particular QAM demodulator also contains a built in "out-of-band" QPSK demodulator for handling command and control data carried by the forward command channel. As such, a single integrated circuit demodulator processes consumer/subscriber requested information (audio and video) as well as command data.

The decoder 206 processes the data packets carrying consumer/subscriber requested information produced by the QAM demodulator into useable signals for the end user display, e.g., television, home studio, video recorder and the like. The decoder 206 is coupled to a dynamic random access memory (DRAM) to facilitate decoding of the data packets and processing of command programs, as shall be discussed below. The signals for display are conventionally processed by a display driver 222 to produce composite video as well as conventional television signals, e.g., modulated onto channel 3 or 4 using the NTSC standard modulation.

The conventional cable signal receiver 224 contains a tuner and an analog (NTSC) demodulator. A multiplexer 226 couples the demodulated analog or decoded video signal to the display driver 222. Of course, the NTSC demodulator can be replaced with a PAL or SECAM standard demodulator, as needed.

The demodulated QPSK signal provides command and control information to the CPU 212 for generating certain graphics and control information regions upon a television screen. The CPU is, for example, a model 68302 processor manufactured by Motorola. This processor, operating in combination with the decoder 206 as well as a continuously available video signal from the information channel, produces screen-displayed buttons, icons and graphical regions with which a consumer interacts using the remote control. Without the video signal, the terminal 136 does not produce any display, i.e., the displays are actively generated in real-time as needed to facilitate certain navigational and interface functions.

Specifically, a joy stick on the remote control 138 selectively highlights certain predefined regions on the television screen. To perform such highlighting, a reference region is always highlighted when a menu is first displayed. From that reference region, direction vectors produced by the joy stick are interpreted by the CPU 212 to highlight a region lying in the direction in which the joy stick was moved. When a desired selectable icon is highlighted, the consumer depresses a "select" key on the remote that sends an infrared signal to an infrared receiver (a support circuit 216). This receiver sends the select command to the CPU 212 for interpretation. The selected region is generally associated with a function. If the function is a request for specific information or requires a change in the menu, the CPU 212 formats the command and sends it through the back channel transmitter 208 for transmission to the video session manager 122. If the command is a function that is handled locally such as volume control, the CPU 212 implements the function within the terminal 136.

Since the session control commands are implemented by the video session manager 122 and not the terminal 136 alone, the number of available session control commands is infinite. Utilization of such distributed computing resources enables the most powerful processing to be centrally located in the video session manager 122 and the CPU in the terminal 136 can be of relatively limited power. Consequently, all the subscriber terminals 136 that are connected to a service provider head end 102 can rely on the computing power of the video session manager 122. For example, the CPU in the video session manager 122 is a model 68040 processor that is available from Motorola Inc. A particular hardware implementation of the video session manager is described in detail in commonly assigned U.S. patent application Ser. No. 08/984,710, filed Dec. 3, 1997 and hereby incorporated herein by reference.

Each command menu is implemented by executing an "applet", as described below. The applets control both information sessions, e.g., the presentation of video to the television screen, and navigator functions, e.g., the menus that facilitate selection of a video program as well as subscriber on demand services. As such, particular commands include, but are not limited to, information or menu navigation commands, movies start at beginning, movies start at the middle, play, stop, rewind, forward, pause and the like. These presentation and navigation control commands are sent via a back channel transmitter 208 using binary phase shift key (BPSK) modulation. Additionally, the CPU in the subscriber terminal implements certain local commands such as increment or decrement the volume, channel change and on/off.

The invention is implemented as one or more interrelated "applets" which, when taken together form the interactive graphical user interface that facilitates the SOD service of the present invention. The applets are transmitted for the most part, to the terminal via the forward information channel. Certain information used by particular applets is transmitted to the terminal via a data stream propagated through the forward command channel. As such, the data stream carrying the applet is demodulated, the applet extracted and the applet's information decoded prior to execution that displays a menu on the display device. The detailed process by which an applet is downloaded and used to produce a menu is disclosed in commonly assigned U.S. patent application Ser. No. 08/984,427, filed Dec. 3, 1997 and hereby incorporated herein by reference.

Figure 3A:
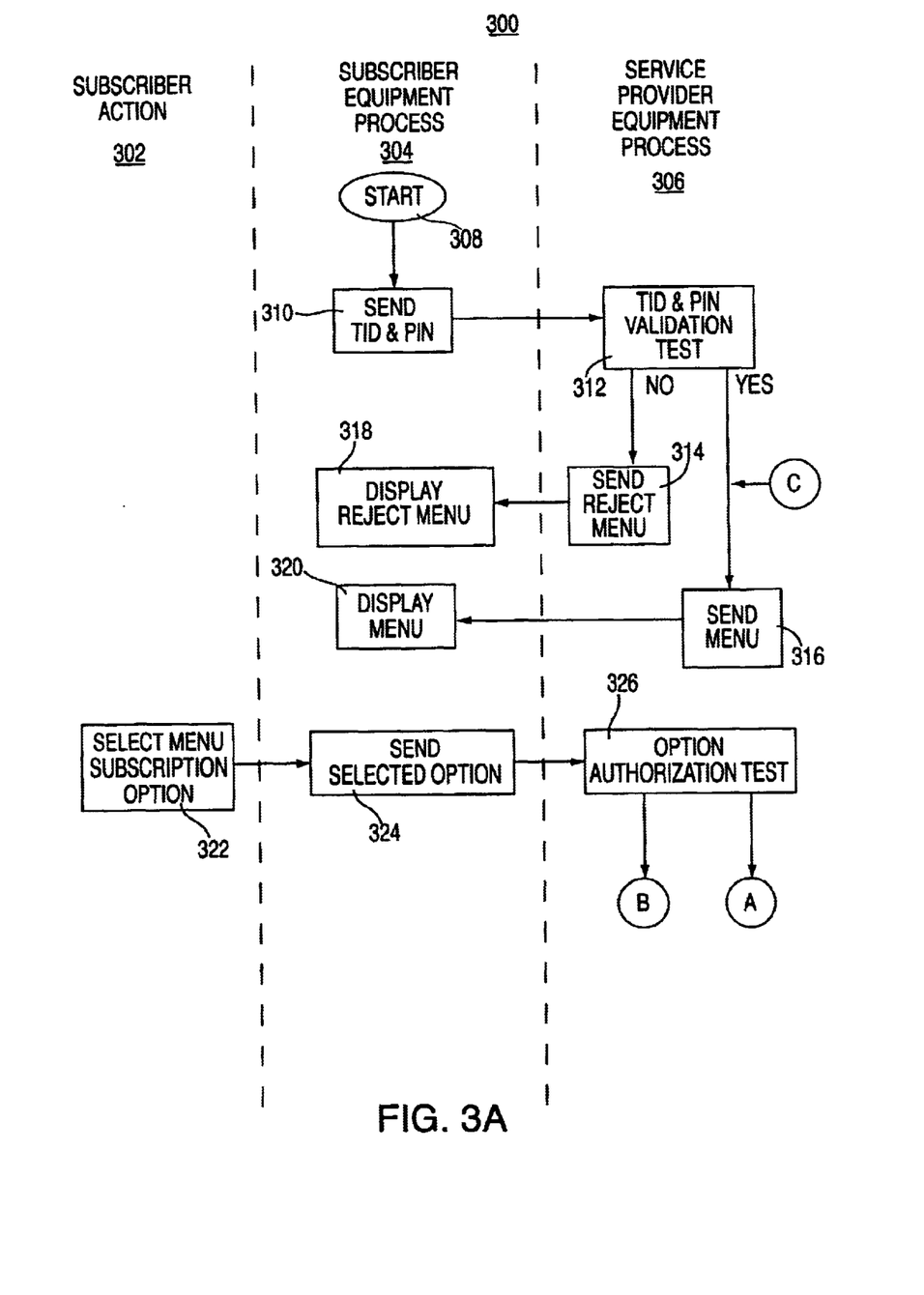
FIGS. 3A, 3B, and 3C together depict a flow diagram of a routine representing the software that is executed within the system of FIG. 1 to provide the subscription-on-demand services of the present invention.
Figure 3B:
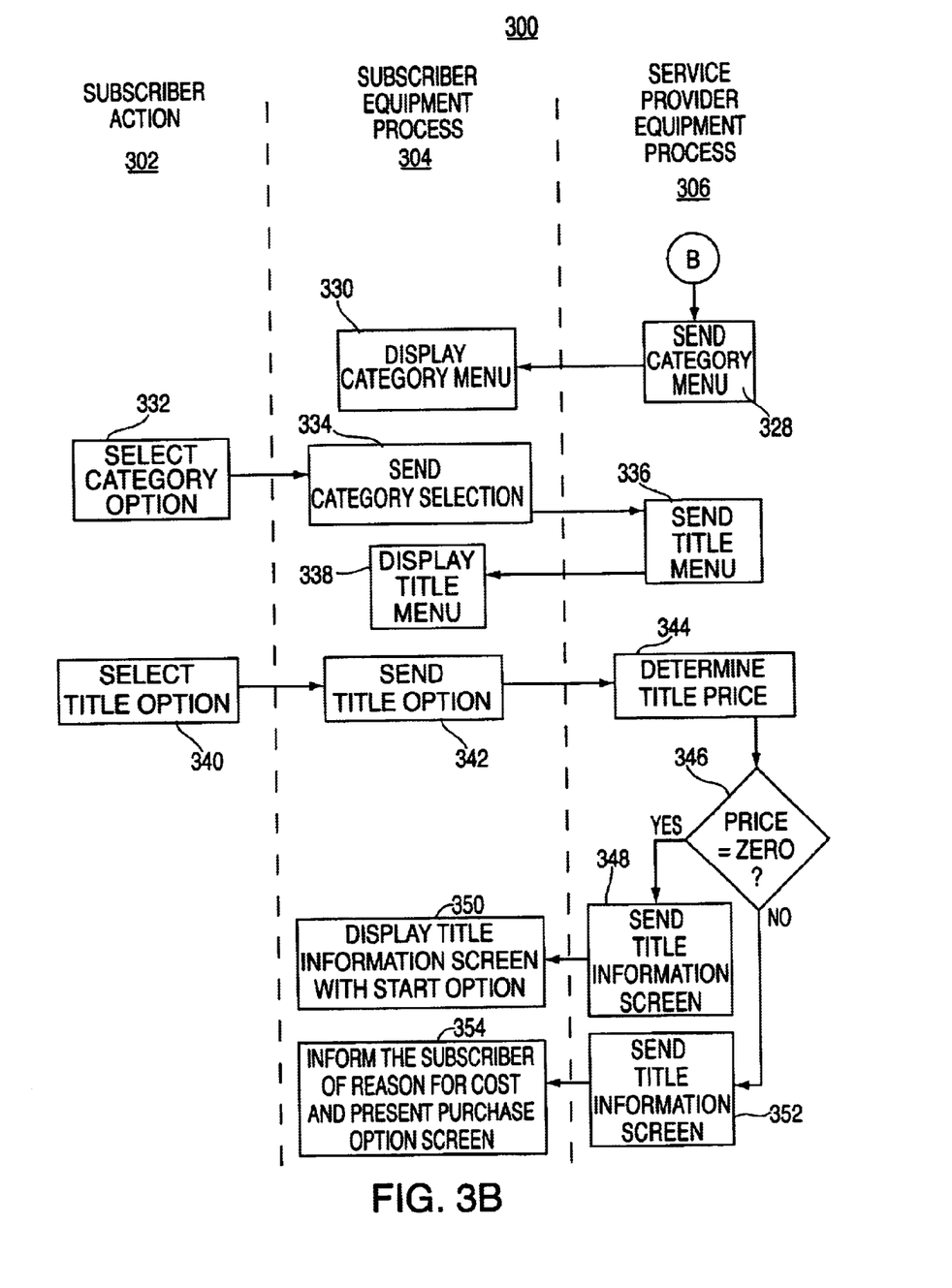
Figure 3C:
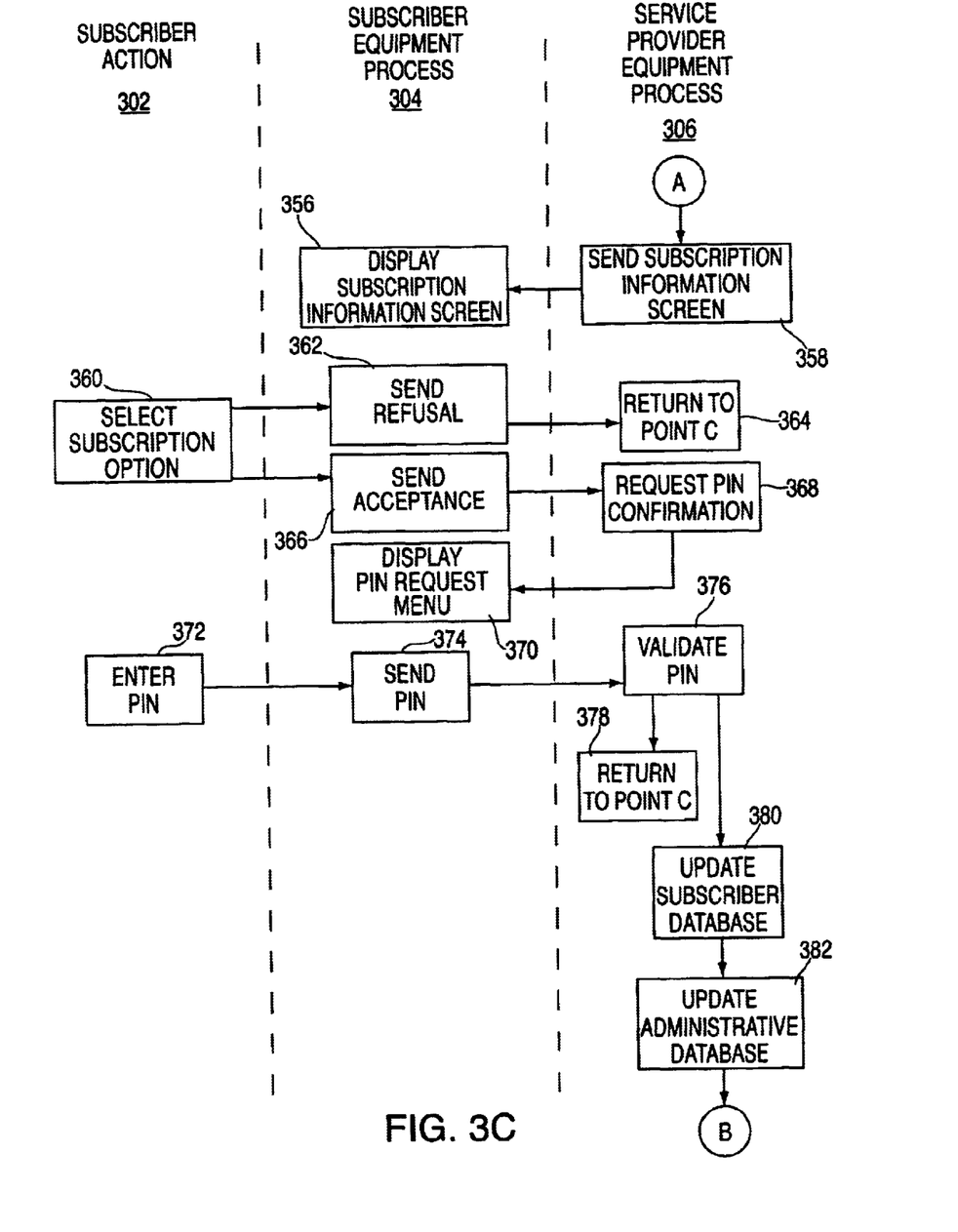

FIGS. 3A, 3B and 3C together depict an overall flow diagram of an illustrative implementation of the SOD service 300 as executed on both the video session manager CPU and the subscriber terminal CPU. FIGS. 3A and 3B are divided into three columns, namely: a subscriber action column 302, a subscriber equipment process 304, and a service provider equipment process 306. FIGS. 4–9 depict various menu screens that a SOD service subscriber or a non-SOD service subscriber (i.e., a consumer) would be presented with while either accessing SOD services or becoming a new subscriber for SOD services. For the following description, it is assumed that the consumer is already a subscriber of general system services (i.e., the consumer has an account number) and now desires to subscribe to additional SOD services or utilize previously subscribed SOD services. To provide a comprehensive understanding of the SOD services, the various menu screens of FIGS. 4–9 are referred to as the flow diagram spanning FIGS. 3A, 3B and 3C is described below.

The process begins at step 308 and continues to step 310. At step 310, the terminal recalls a terminal identification number and a PIN from memory and sends the number to the service provider equipment. As described in commonly assigned U.S. patent application Ser. No. 08/738,343, filed Oct. 29, 1996, to provide security and limit programming access, each terminal of the interactive information distribution system is generally assigned a terminal identification (TID) number or code, each subscriber household account has a defined master personal identification number (master PIN), and each subscriber in a household may have a personal identification number (subaccount PIN). The TID provides security to identify whether a subscriber terminal is permitted access to the system at all, while the master PIN and subaccount PIN define the level of service that a given subscriber is permitted to access. In addition to the TID, a master PIN may be associated with a subset of subaccounts each having an associated PIN. The assignment and utilization of master PIN and subaccount PINs is described in commonly assigned U.S. patent application Ser. No. 08/738, 343, filed Oct. 29, 1996 and hereby incorporated herein by reference. In general, the terminal identification number and both the master and the subaccount PINs are used in providing the SOD service of the present invention.

At step 312, the video session manager 122 validates the PIN and TID authorization by comparing the transmitted TID and PIN to a PIN and TID stored in the video session manager memory. If the transmitted TID and PIN are not in the memory, the video session manager sends, at step 314, a menu applet that creates a display to inform the subscriber that the PIN or TID is invalid. If the TID and PIN are found to be valid, at step 316, the video session manager sends a menu applet to the terminal that will permit access to additional system programming.

To facilitate selection of an SOD service, a menu is presented at step 320 to the subscriber on their television screen. As illustratively shown in FIG. 4, the menu structure may be defined by a grid or list or, in the example shown, a pie-shaped menu 400. Various services may be selected by highlighting and selecting any one of the "pie" sections 402, 404, 406, or 408. Whenever a menu selection is made, the system downloads an applet corresponding to that section and either launches a new menu that provides further options for the subscriber or displays a selected program (e.g., starts playing a movie).

Figure 4:
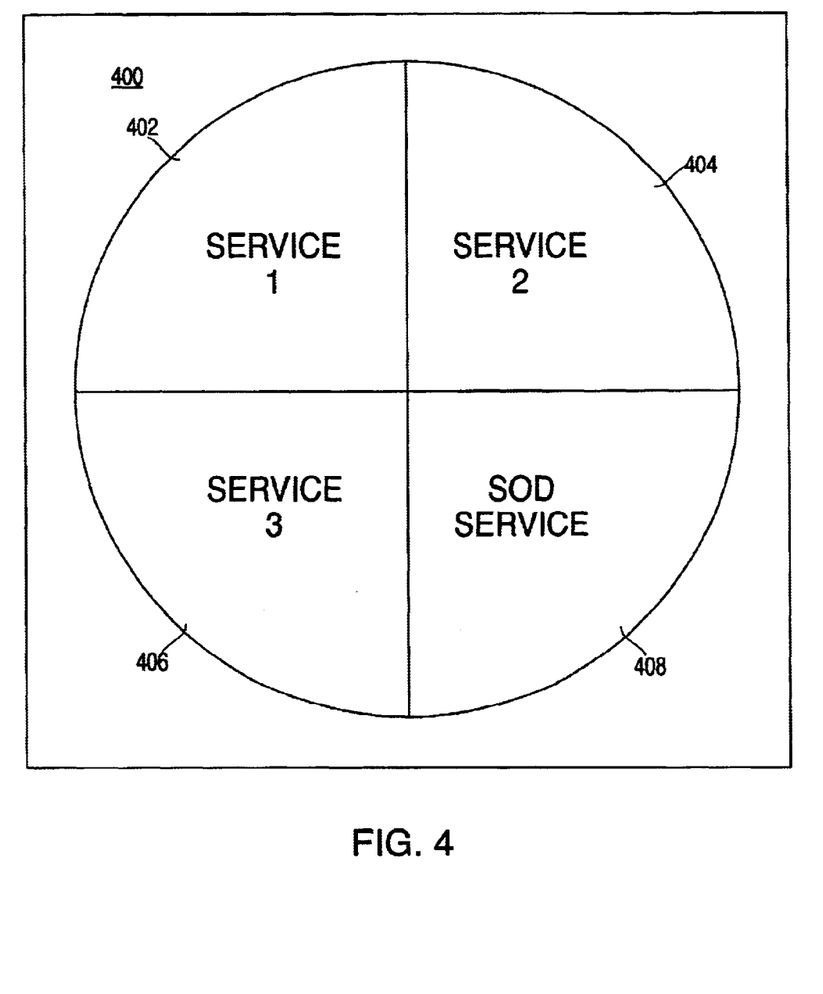
FIG. 4 depicts an illustrative menu structure for selecting a subscription-on-demand service.

To select SOD services, the user highlights section 408 that may be, for example, a children's program SOD service known as "OnSet Kids" (OnSet is a trademark of DIVA Corporation of Menlo Park, Calif.). In such a service, a user can subscribe to unlimited access to any of the children's programs offered under the subscription package "OnSet Kids". More generally, the subscription packages may consist of a collection of programs having a common point of interest, e.g., sports, cooking, travel, automotive, educational, children's programming, home improvement, soap operas, network prime time television broadcasts, music videos, and the like. Subscription packages are alternatively customized by a subscriber at the time of subscription.

For the illustrative menu example of FIG. 4, the subscriber is assumed to have selected, at step 322, the SOD service of section 408 that is associated with the children's programming subscription. Once a section is selected, the terminal sends, at step 324, an option request corresponding to the selected menu option to the session manager 122.

At step 326, the system determines whether the consumer/subscriber has a subscription for the selected service. To determine such subscription service authorization, the account number of the subscriber is compared to a subscription account number database in the network manager. If the subscriber is authorized to access the selected service (the SOD service of option 408 in FIG. 4), the process proceeds to point B of FIG. 3B. Alternatively, if authorization for the selected service is not found, the process proceeds to point A of FIG. 3C.

Figure 5:
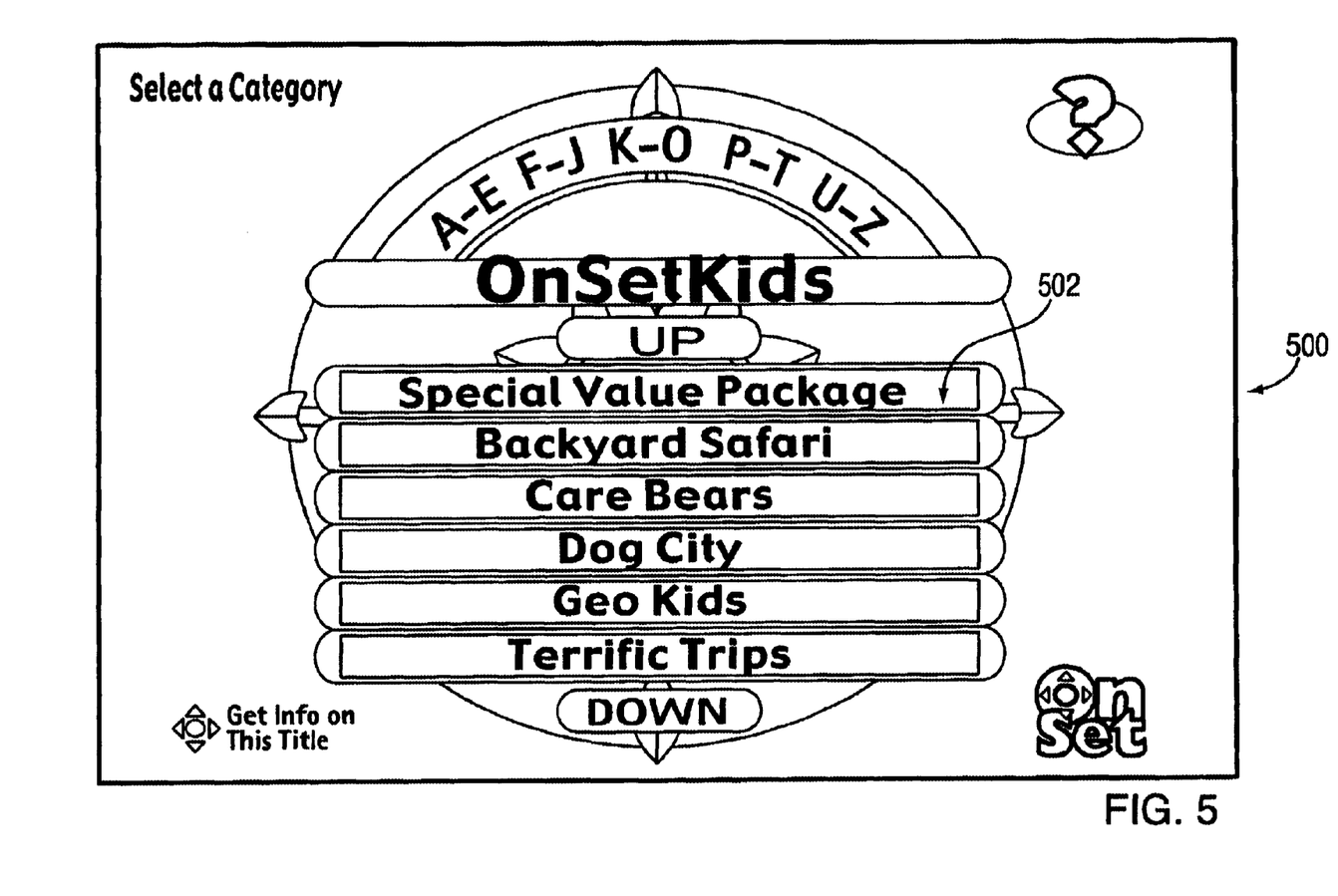
FIG. 5 depicts a menu structure used to select a subscription item that is a subset of the subscription-on-demand service.

At step 328, the video session manager sends an applet to the terminal to enable the terminal to produce a category menu at step 330. FIG. 5 depicts an exemplary category display 500 for a children's program subscription, e.g., OnSet Kids. The depicted menu 500 shows a list 502 of selectable categories. Each category in the list 502 represents a particular class of programming, i.e., programming that is related in some way.

Figure 6:
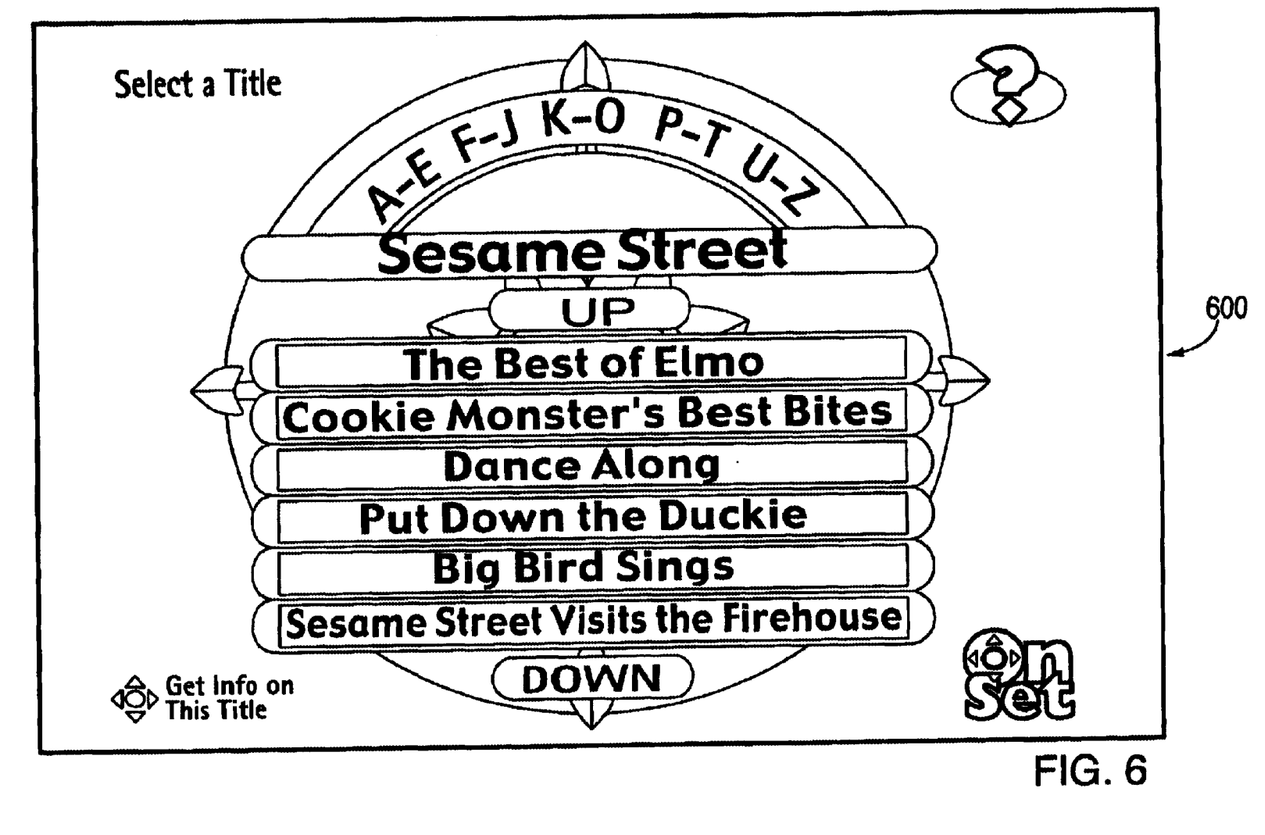
FIG. 6 is a menu depicting titles of programming within a specific category within said subscription on demand service.

At step 332, the subscriber selects a category within the category menu and, at step 334, the terminal sends a category request to the video session manager. After receiving a category selection in step 336, the video session manager sends an applet for a title menu to the terminal. At step 338, the terminal decodes and executes the applet to display a title menu. FIG. 6 depicts an exemplary menu list 600 having a list of titles that are associated with the selected category, in this case, Sesame Street.

Figure 7:
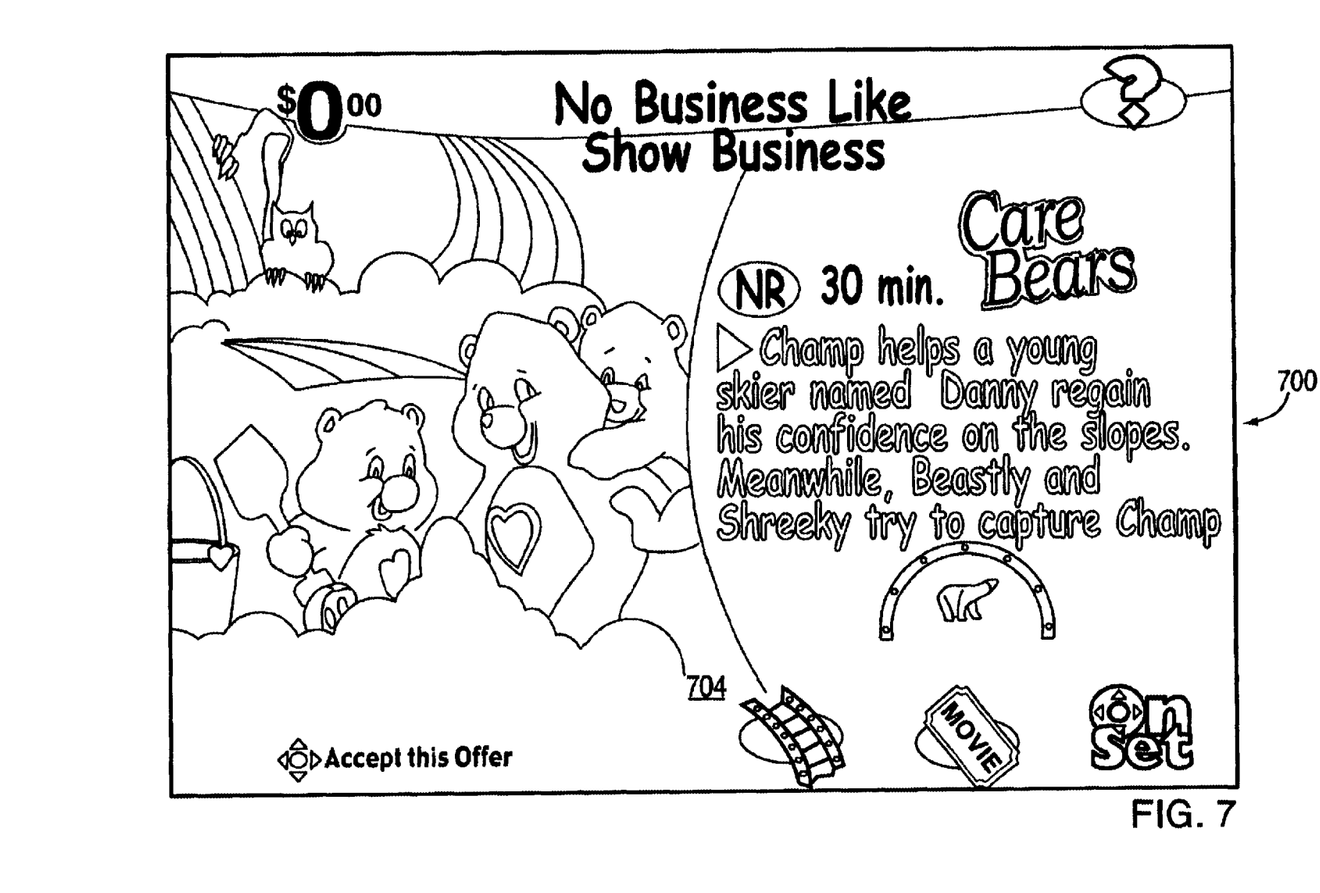
FIG. 7 is a title information screen.

When the subscriber selects a title in step 340, the title selection, e.g., a program identification (PID), is sent to the video session manager. After receiving a title selection, the video session manager determines, at step 344, the title price. The price of the programming selected from the title menu is determined by the video session manager sending a price request to the network manager. The network manager performs a search of its pricing database and returns a price of either zero or non-zero. A non-zero price is returned, for example, if the subscription is limited to a restricted time window. For example, the OnSet Kids children's programming subscription service may be limited to viewing from 6 A.M. to 6 P.M. and, the request is being made outside of that time window. As such, any request by a subscriber outside of the window is charged a nominal fee, i.e., the subscriber is provided an "a la carte" menu as described below with respect to step 354. If the price that is returned to the video session manager is zero dollars (the query of step 346 is affirmatively answered), then the video session manager sends, at step 348, an applet for a display of a title information screen. At step 350, the terminal displays a title information screen indicating the viewing price is zero dollars and also provides the subscriber with a start option so that the subscriber may commence viewing of the program. FIG. 7 is an exemplary title information screen 700 showing information about the program that was selected as well as providing a start option as shown as button 702. Additionally, a preview clip may be executed and depicted for the user by selecting the icon 704.

If, however, the network manager returns a non-zero price to the video session manager, then the video session manager sends, at step 352, an applet for a second type of title information screen. At step 354, the terminal creates a screen informing the subscriber of the reason for the non-zero price and also presents the user with an "a la carte" purchase option. The subscriber will then be able to purchase and view the a la carte selection or return to a previous menu.

If, at step 326 of FIG. 3A, the service provider equipment determines that the consumer does not have an active subscription, e.g., does not have a subscription to the selected subscription package, the process proceeds along path A to step 358 of FIG. 3C. At step 358, the video session manager sends an applet for a subscription information screen. The subscription information screen applet is decoded and executed by the terminal at step 356 to create a subscription information screen. The subscription information screen describes the subscription offering to the non-subscriber and then presents a sign-up screen through which the user can interactively subscribe for the service period.

Figure 8:
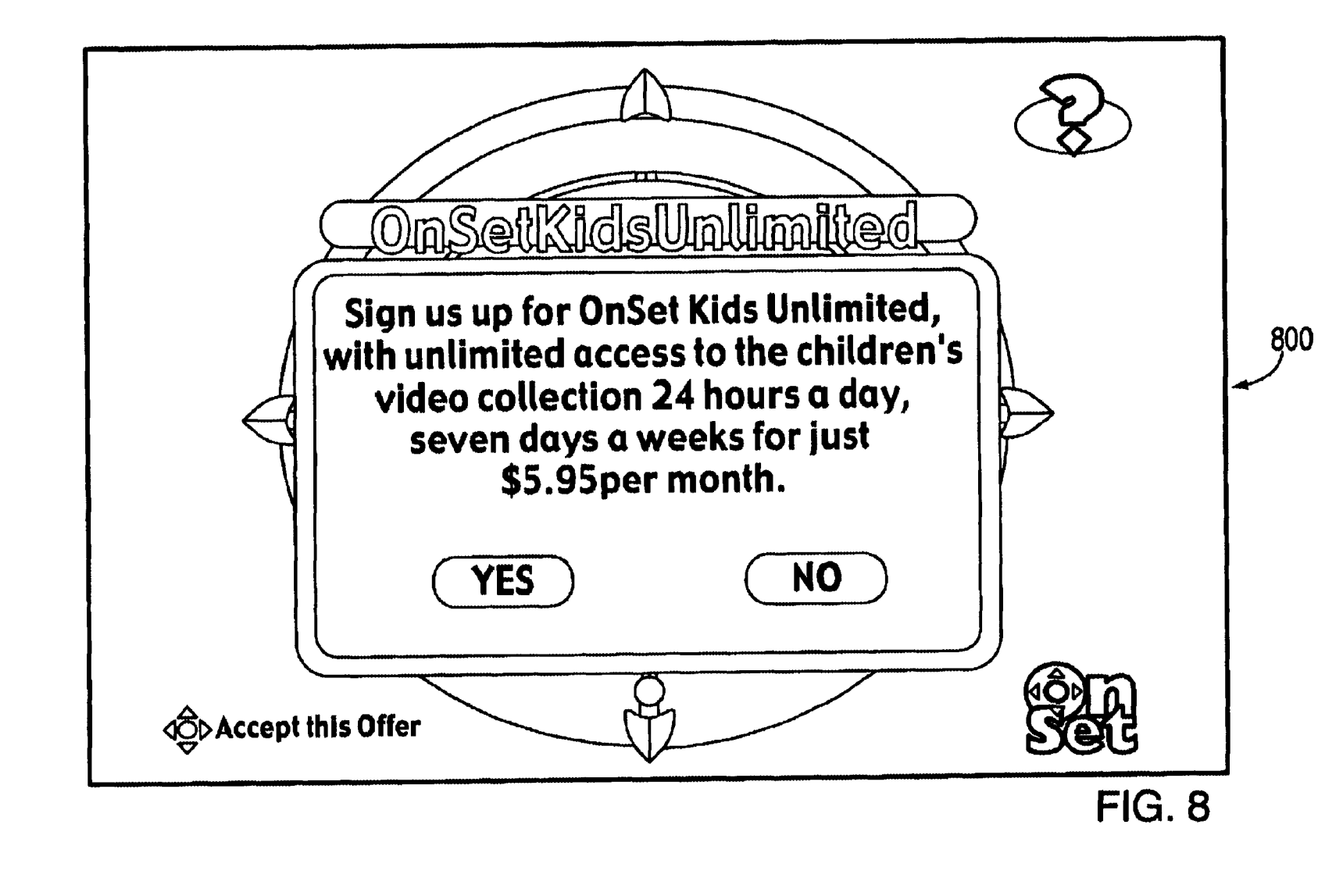
FIG. 8 is a menu that allows a consumer to subscribe to a selected subscription-on-demand service.

FIG. 8 depicts an exemplary screen 800 for interactively requesting a subscription-on-demand service, i.e., offers the subscriber an option to purchase a subscription. If the subscriber declines (step 360) the subscription offer, the terminal then sends, at step 362, a refusal signal to the session manager. In response to the refusal, the process returns (step 364) to point C prior to step 316 in FIG. 3A. If, however, a system subscriber elects to purchase a category subscription, the terminal sends, at step 366, an acceptance signal. In response to the acceptance signal, at step 368, the session manager requests a master PIN as a confirmation of the subscriber's capability to make a subscription purchase. As such, a person having only a subaccount PIN is not capable of subscribing to a subscription-on-demand service. To facilitate the subscription confirmation, the session manager sends an applet for a master PIN request screen. At step 370, the terminal decodes the applet and displays the master PIN request screen.

Figure 9:
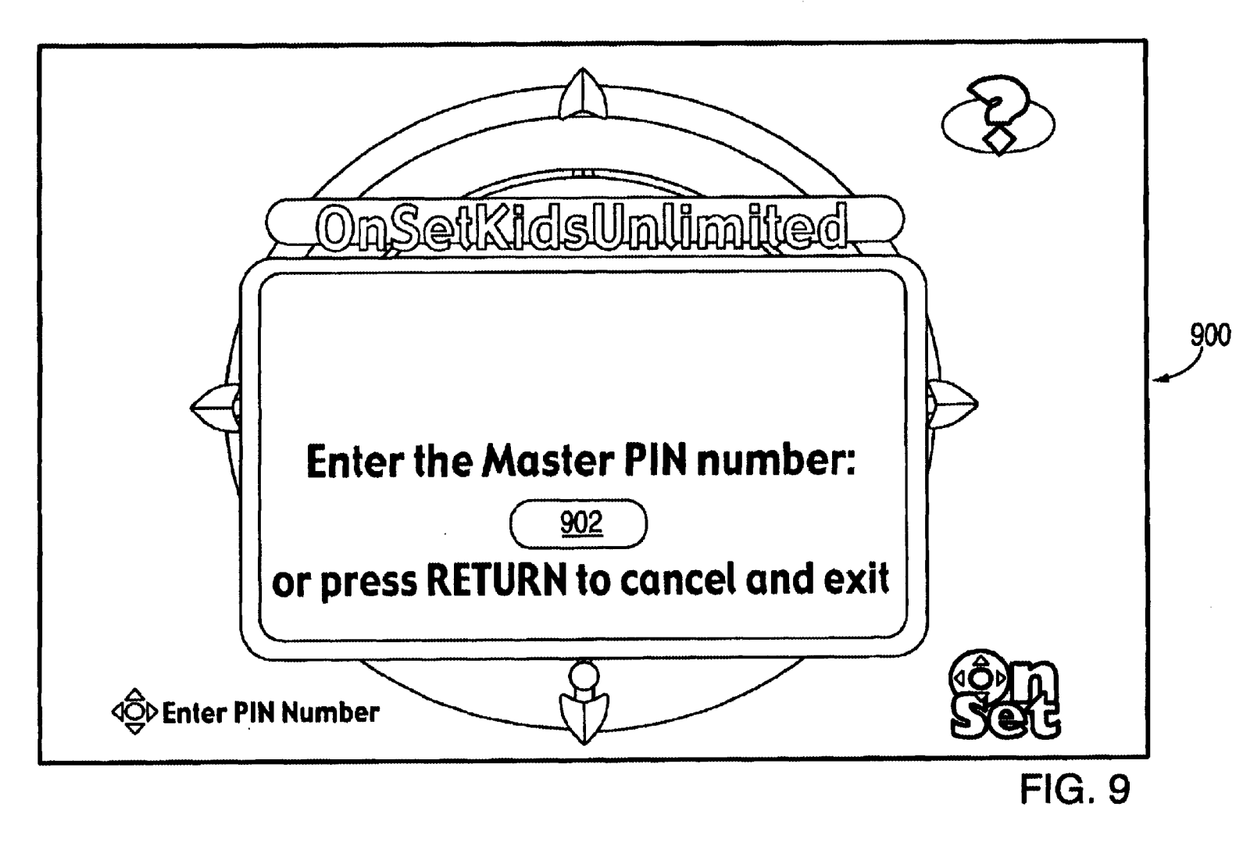
FIG. 9 is a menu that provides an input structure for a master PIN number.

FIG. 9 depicts an exemplary master PIN confirmation entry screen 900. The screen 900 contains a field 902 where the subscriber can enter a master PIN. The master PIN is entered at step 372 and, at step 374, the master PIN is sent to the session manager. After the master PIN is received, at step 376, the video session manager verifies the master PIN as valid. To verify the validity of the PIN, the video session manager compares the entered PIN to the PIN in its memory. If the master PIN is invalid, the subscriber is given one or more further opportunities to correctly enter the master PIN, then the process proceeds to step 378 where the process continues at point C prior to step 316 of FIG. 3A. If the PIN is valid, the routine proceeds to step 380 where the video session manager updates the subscription database stored in the network manager with the account number of the new subscriber to the selected subscription service. After updating the subscription data base, the routine updates, at step 382, the administrative system such that the interactive information distribution system's billing system is updated with the new subscriber's account number. Once subscribed, the process proceeds from step 382 to step 328 of FIG. 3B where the system provides the new subscriber an opportunity to utilize the newly subscribed service.

The present invention implements subscription-on-demand services by having the computer resources needed for the service to be distributed between the subscriber equipment and the service provider equipment. To implement the service, the terminal need only decode and execute simple applets to produce various interactive displays and send simple information requests. The service provider equipment performs the significant computing for menu generation, security handling, and subscription processing. As such, the terminal can be relatively inexpensive, making the overall system economically feasible.

The interactive structure of the inventive subscription-on-demand system enables flexible subscription packages to be created. For example, a hierarchical subscription package structure can be produced that has various levels of access. The following is an illustrative example of a hierarchical package structure for sporting events:

```
SPORTS
    FOOTBALL
        COLLEGE
        PRO
    BASKETBALL
        COLLEGE
            MENS
            WOMENS
        PRO
            MENS
            WOMENS
    GOLF
    HOCKEY
``` and so on Under this hierarchy, a consumer may subscribe to SPORTS and receive access to all sports programming available for a predefined price. However, those that desire only to have access to, for example, men's professional basketball would subscribe only to that particular programming selection at a predefined price. Such a hierarchical arrangement can be divided into any number of levels, e.g., specific teams, or grouped into various packages, e.g., all professional sports. Additionally, the invention can be expanded to enable consumers to create their own personal SOD service by selecting their favorite programs or program classes for grouping into an SOD package such that a single price can be paid to access all the selected programming over a pre-defined period of time, e.g., a predefined price for accessing the selected programming for a month. As such, dynamically defined subsets of content can be created as the personal SOD packages. The programming is selected through manipulation of interactive menus (generated using menu applets as described above) and the program identification codes (PIDs) for the selected programming are stored in the subscription database with the consumer's account number (and/or PIN or TID, if needed). As such, the subscriber can access their personal SOD service at any time and without further payment. At the end of the period, the service would be renewable such that the subscriber would not have to reenter the selection at the end of each period.

Although various embodiments which incorporate the teachings of the present invention have been shown and described in detail herein those skilled in the arts can readily devise many other varied embodiments that still incorporate these teachings.

What is claimed is:

1. A method for a subscriber on-demand service in a television provisioning system having subscribers, the television provisioning system comprising regions, each of the regions capable of subscribing to a package, the package comprising program channels and a group of on-demand programs, the method comprising:
   grouping the on-demand programs into subgroups, the subgroups each comprising at least two on-demand programs; and
   providing user selectability for purchasing on-demand viewing access to at least one subgroup of the subgroups for a price.

2. The method of claim 1 wherein the price is a subscription fee.

3. The method of claim 2 wherein the subscription fee is added onto a service fee for the package.

4. The method of claim 1 wherein the price is not a subscription fee.

5. The method of claim 4 wherein the price is a fixed price.

6. The method of claim 1 wherein the at least one subgroup is purchased with at least one viewing time window.

7. The method of claim 1 wherein the price is discounted as compared to individually purchasing each of the on-demand programs in the at least one subgroup.

8. The method of claim 7 wherein the price is not a subscription fee.

9. The method of claim 7 wherein the price is a subscription fee.

10. The method of claim 7 wherein the price is discounted at least in part owing to a time limited viewing window for the on-demand programs of the at least one subgroup.

11. The method of claim 1 further comprising the step of providing user selectability for purchasing on-demand viewing access to an on-demand program, whether or not a portion of the at least one subgroup.

12. The method of claim 1 further comprising the step of discounting the on-demand program purchased when the on-demand program is in the at least one subgroup and is viewed outside of a purchased viewing window.

13. A method for a subscriber on-demand service in a television provisioning system having subscribers, the television provisioning system comprising regions, each of the regions capable of purchasing a package, the package comprising program channels and a group of on-demand programs, the method comprising:
   grouping the on-demand programs into subgroups according to content, the subgroups each comprising at least two on-demand programs; and
   providing user selectability for purchasing viewing access to the at least one subgroup for a fee.

14. The method of claim 13 wherein the fee is a subscription fee.

15. The method of claim 14 wherein the subscription fee is added onto a service fee for the package.

16. The method of claim 13 wherein the fee is not a subscription fee.

17. The method of claim 13 wherein the fee is discounted at least in part owing to a time limited viewing window for the on-demand programs in the at least one subgroup.

18. The method of claim 13 wherein the at least one subgroup is purchasable at a discounted rate as compared to individually purchasing each of the on-demand programs in the at least one subgroup.

19. The method of claim 18 wherein the fee not a subscription fee.

20. The method of claim 18 wherein the fee is a subscription fee.

21. The method of claim 20 wherein the subscription fee is added onto a service fee associated with the package.

22. The method of claim 13 further comprising the step of providing user selectability for purchasing on-demand viewing access to an on-demand program, whether or not a portion of the at least one subgroup.

23. The method of claim 22 further comprising the step of discounting the on-demand program purchased when the on-demand program is in the at least one subgroup and is viewed outside of a purchased viewing window.

24. The method of claim 13 wherein the content is arranged in by category and subcategory.

* * * * *

UNITED STATES PATENT AND TRADEMARK OFFICE
CERTIFICATE OF CORRECTION

PATENT NO. : 6,684,400 B1
DATED : January 27, 2004
INVENTOR(S) : Christopher Goode et al.

It is certified that error appears in the above-identified patent and that said Letters Patent is hereby corrected as shown below:

Title page,
Item [56], References Cited, OTHER PUBLICATIONS, insert:
-- Digital Television and Multimedia - Concepts, Technological Problems, Perspectives", K. Harder, FKTG Conference, Berlin, 3/21/95 --

Column 11,
Between lines 20 and 21, insert -- and so on --.
Line 22, delete the words "and so on".

Signed and Sealed this

Twentieth Day of April, 2004

JON W. DUDAS
*Acting Director of the United States Patent and Trademark Office*